United States Patent
Walter (10) Patent No.: US 8,584,990 B2
(45) Date of Patent: Nov. 19, 2013

(54) METHOD AND DEVICE FOR YAW CONTROLLING OF AN AIRCRAFT

(75) Inventor: Stéphane Walter, Brax (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/369,567

(22) Filed: Feb. 9, 2012

(65) Prior Publication Data

US 2012/0205495 A1  Aug. 16, 2012

(30) Foreign Application Priority Data

Feb. 15, 2011 (FR) ...................................... 11 51225

(51) Int. Cl.
*B64C 19/02* (2006.01)
(52) U.S. Cl.
USPC ........................... 244/211; 244/220; 244/235
(58) Field of Classification Search
USPC .......... 244/211, 75.1, 184, 220, 87, 235, 236, 244/194, 76 R
See application file for complete search history.

(56) References Cited

U.S. PATENT DOCUMENTS

| | | | | |
|---|---|---|---|---|
| H2206 | H * | 12/2007 | Milgram | 244/75.1 |
| 8,200,379 | B2 * | 6/2012 | Manfredi et al. | 701/14 |
| 2002/0022910 | A1 | 2/2002 | Kubica et al. | |
| 2009/0222151 | A1 | 9/2009 | Averseng | |

FOREIGN PATENT DOCUMENTS

| | | |
|---|---|---|
| DE | 102004029196 | 1/2006 |
| EP | 1160158 | 12/2001 |
| WO | 2007048960 | 5/2007 |

OTHER PUBLICATIONS

French Patent Office, French Search Report FR 1151225, Nov. 28, 2011 (2 pgs).

* cited by examiner

*Primary Examiner* — Timothy D Collins
*Assistant Examiner* — Jessica Bowen
(74) *Attorney, Agent, or Firm* — Wood, Herron & Evans, LLP (57) ABSTRACT

According to the invention, an alert may be generated when a sudden inversion of the rudder occurs. To this end, the pilot having beforehand moved a commanding system in such a manner that the movement of the commanding system overcomes the position of the commanding system corresponding to the maximum rotation breakpoint in one of the rotating directions of the rudder. The alert is launched if, during a first time interval having a predetermined duration, the pilot moves the commanding system in such a manner that the movement of the commanding system overcomes the position of the commanding system corresponding to the maximum rotation breakpoint in the other rotating direction of the rudder, thereby indicating a sudden rudder inversion and a potential unsafe condition to be corrected by the pilot.

16 Claims, 4 Drawing Sheets

METHOD AND DEVICE FOR YAW CONTROLLING OF AN AIRCRAFT

TECHNICAL FIELD

The present invention relates to a method and a device for yaw controlling of an aircraft.

BACKGROUND

It is known that yaw controlling of an aircraft is mainly ensured by a rudder jointed to a vertical stabilizer, being able to rotate in two opposite rotating directions between an aerodynamically neutral position and a maximum rotation breakpoint. To this end, the rudder is controlled by a mobile commanding system (directional crossbar) available to the pilot of the aircraft. This system is generally provided with two pedals which, upon their respective depressions, result in the system being moved in two opposite directions associated respectively with two opposite rotating directions of the rudder. In particular, this directional crossbar controls the rotation of the rudder so that the extent of the rotation of the rudder depends on the extent of the movement of the directional crossbar. Thus, depressing the right pedal, for instance, results from the pilot's intention to generate a yaw moment tending to move the nose of the aircraft to the right, such a moment being achieved by a deflection to the right of the rudder. Thus, when the pilot of the aircraft wishes to correct the lateral trajectory of the aircraft, he can act on the directional crossbar with the purpose of implementing the rudder.

It is also known that it could be provided, when the speed of such an aircraft exceeds a limitation speed threshold, to limit the rotation of the rudder inversely proportionally to the speed of the aircraft, with the purpose of limiting the constraints said aircraft is submitted to at a high speed and, thus, allowing yaw maneuvers to be achieved, including at a high speed.

Thus, when the speed of the aircraft is lower than this limitation speed threshold, if the pilot moves one of the pedals of the directional crossbar until one of the maximum rotation breakpoints of the rudder is reached (in one of the two rotating directions of said rudder), the directional crossbar has itself reached a breakpoint. On the other hand, when the speed of the aircraft is at least equal to this limitation speed threshold, if the pilot moves one of the pedals of the directional crossbar until one of the maximum rotation breakpoints of the rudder is reached (in one of the rotating directions of said rudder), he is still able to move the directional crossbar. In such a case, the movement of the directional crossbar by the pilot could overcome the position of the latter corresponding to the maximum rotation breakpoint of the rudder in one of the rotating directions of said rudder, and the pilot could therefore generate an over-command at the level of said rudder.

It should however be noticed that, when the speed of the aircraft is higher than this limitation speed threshold, if the pilot has beforehand moved one of the pedals of the directional crossbar so that the movement of the directional crossbar overcomes the position of the latter corresponding to the maximum rotation breakpoint in one of the rotating directions of the rudder, with the purpose to carry out, thru an over-command, a yaw maneuver in this same direction, it is possible that the latter suddenly wishes to carry out an opposite yaw maneuver, that is in the other direction, also thru an over-command. To this end, the pilot moves the other pedal of the directional crossbar so that the movement of said directional crossbar overcomes the position thereof corresponding to the maximum rotation breakpoint in the opposite rotating direction of the rudder.

Now, upon such a sudden inversion of the position of the rudder (from one of the maximum rotation breakpoints of the rudder to the other, the aircraft undergoes excessive charges at the level of the vertical stabilizer, linked to too a quick variation of the rotation amplitude of the rudder.

The object of the present invention therefore aims at preventing such a risk for the aircraft upon a yaw maneuver.

SUMMARY OF THE INVENTION

To this end, according to this invention, the method for yaw controlling of an aircraft, the aircraft comprising:
  a jointed rudder, being able to rotate in two opposite rotating directions between an aerodynamically neutral position and a maximum rotation breakpoint; and
  a mobile commanding system, being available to the pilot of the aircraft, for the command of the rudder, the commanding system being able to be moved in two opposite directions, one of the directions being associated with one of the rotating directions of the rudder, whereas the opposite direction is associated with the opposite rotating direction of the rudder, the rotation amplitude of the rudder depending on the amplitude of the movement of commanding system and the movements of commanding system being able to overcome the positions of the latter corresponding respectively to the maximum rotation breakpoints of the rudder, is remarkable in that, the pilot having beforehand moved the commanding system so that the movement of the system overcomes the position of the latter corresponding to the maximum rotation breakpoint in one of the rotating directions of the rudder, an alert is released if, during a first time interval having a predetermined duration, the pilot moves the commanding system so that the movement of the system overcomes the position of the latter corresponding to the maximum rotation breakpoint in the opposite rotating direction of the rudder.

Thus, thanks to the invention, when the pilot initiates an inversion of the over-command of the rudder, he is warned of the risk involved by such a maneuver, allowing to give him the possibility to decide whether it is appropriate to maintain his inversion instructions, or even, on the contrary, to cancel his inversion instructions, moving the commanding system so as to avoid a complete rotation of the rudder from a maximum rotation breakpoint to the other.

Preferably, the duration of the first time interval is at most equal to 3 seconds. It has been reported that a duration ranging between 1 and 2 seconds is a satisfactory compromise between, on the one hand, the detection of an inversion of command of the rudder and, on the other hand, the alert releasing speed.

If the movement of the commanding system cannot overcome the positions of the latter corresponding respectively to the maximum rotation breakpoints of the rudder when the speed of the aircraft is at least equal to a limitation speed threshold, the alert can only be released when the speed of said aircraft is at least equal to an alert speed threshold being itself higher than the limitation speed threshold. Thus, the alert could only be released at high speeds of the aircraft, just where the risks involved by a yaw inversion are the highest.

When the alert is released, it could be maintained during a second time interval of a predetermined duration being at least approximately equal to 5 seconds.

Furthermore, the alert could be released as a visual or a sound signal to the attention of the pilot.

For implementing the method according to the present invention, a device for yaw controlling of an aircraft, the aircraft comprising:

a jointed rudder, being able to rotate in two opposite rotating directions between an aerodynamically neutral position and a maximum rotation breakpoint; and a mobile commanding system, being available to the pilot of the aircraft, for the command of the rudder, the commanding system being able to be moved in two opposite directions, one of the directions being associated with one of the rotating directions of the rudder, whereas the opposite direction is associated with the opposite rotating direction of the rudder, the rotation amplitude of the rudder depending on the amplitude of the movement of the commanding system and the movements of the commanding system being able to overcome the positions of the latter corresponding respectively to the maximum rotation breakpoints of the rudder.

The aircraft is remarkable in that it comprises:

a transducer that measures the amplitude of the movement of the commanding system; and an alert system that emits an alert if, the pilot having beforehand moved the commanding system so that the movement of the system overcomes the position of the latter corresponding to the maximum rotation breakpoint in one of the rotating directions of the rudder, in a first time interval of a predetermined duration, the pilot moves the commanding system so that the movement of the system overcomes the position of the latter corresponding to the maximum rotation breakpoint in the opposite rotating direction of the rudder.

BRIEF DESCRIPTION OF THE DRAWINGS

The FIGS. of the appended drawing will better explain how this invention can be implemented. In these FIGS., like reference numerals relate to like components.

FIG. 1 is a front view of a civil cargo airplane the present invention could be applied to.

DETAILED DESCRIPTION

Figure 1:
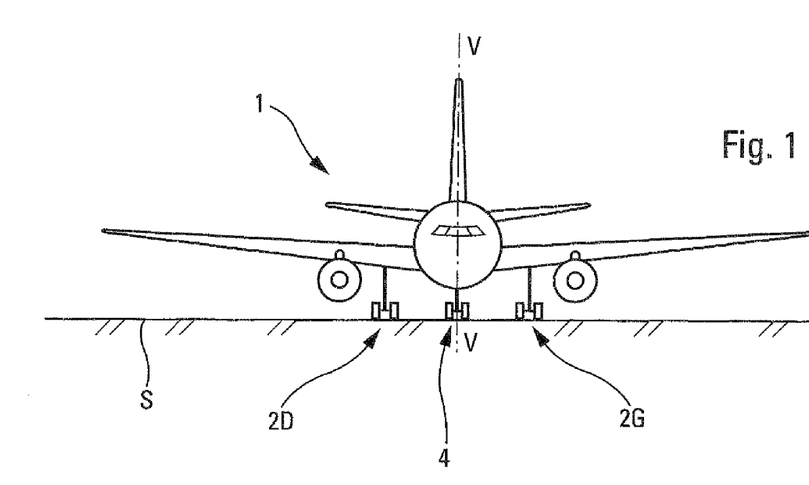
Figure 2:
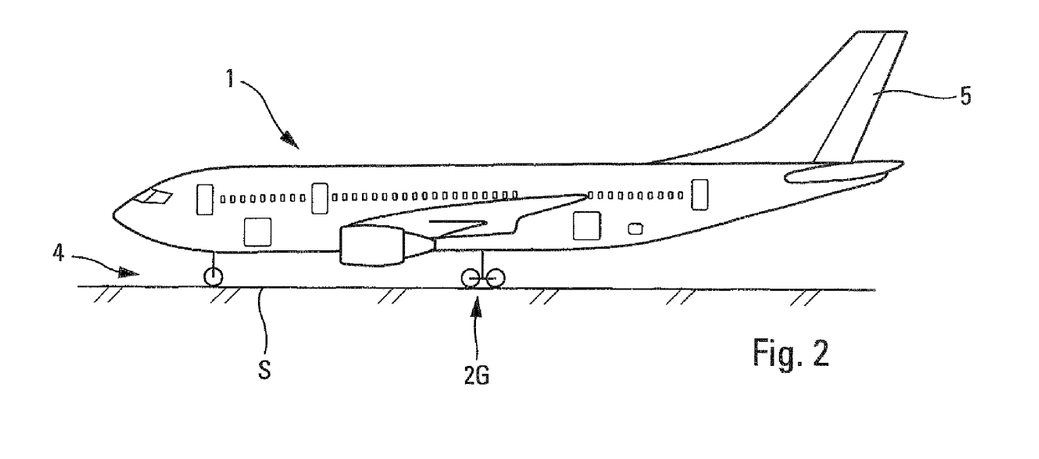
FIG. 2 is a side view of the airplane of FIG. 1.

The airplane 1, schematically shown on FIGS. 1 and 2 and running on the ground S, comprises a pair of main wheel assemblies 2G and 2D, as well as a leading nose gear 4, being arranged in the vicinity of the nose of the airplane 1 and a rudder 5 arranged at the back of the airplane 1. The wheel assemblies 2G and 2D, respectively arranged to the left and to the right of the airplane 1, are mutually symmetrical with respect to the median longitudinal vertical plane V-V of the airplane 1.

Figure 4:
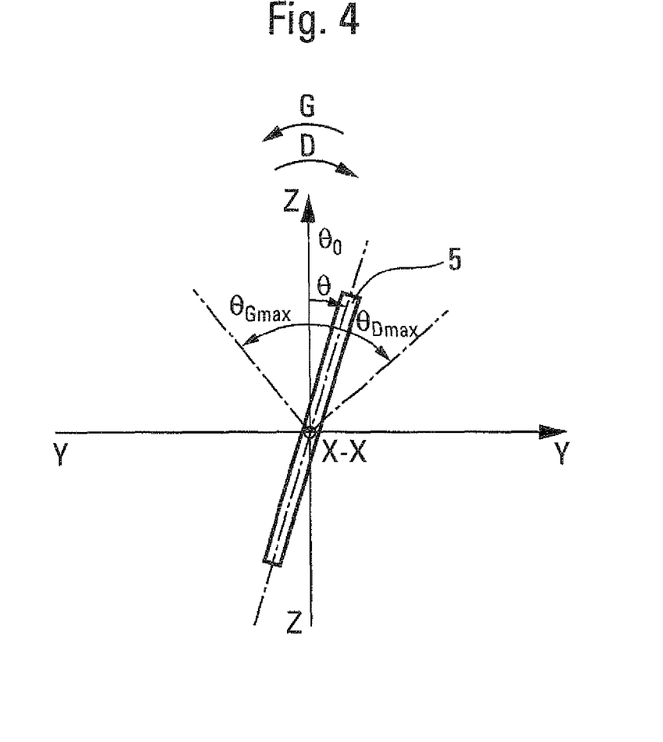
FIG. 4 is a top view of the rudder of the aircraft of FIGS. 1 and 2.

As shown on FIG. 4, the rudder 5 is jointed and is able to rotate in two opposite rotating directions G (left) and D (right), around a vertical axis X-X belonging to the plane V-V. On this FIG., the angle of rotation of the rudder 5, with respect to an axis Z-Z belonging to a plane (Y-Y, Z-Z) being orthogonal to the axis of rotation X-X of said rudder, is referred to by $\theta$.

The rudder 5 is able to rotate, in each one of the two rotating directions G and D, between an aerodynamically neutral position, corresponding to an angle $\theta_0$ (with a nil value), and a maximum rotation breakpoint, referred to be $\theta_{Gmax}$ (with a positive value) for a rotation in the direction G (to the left) and $\theta_{Dmax}$ (with a negative value) for a rotation in the direction D (to the right). The total potential amplitude of rotation of the rudder 5 is therefore equal to $\theta_{Gmax} - \theta_{Dmax}$.

It should be noticed that for a symmetrical rudder 5, $\theta_{Gmax}$ is the opposite of $\theta_{Dmax}$ and the total amplitude is therefore equal to $2.\theta_{Gmax}$.

Figure 3:
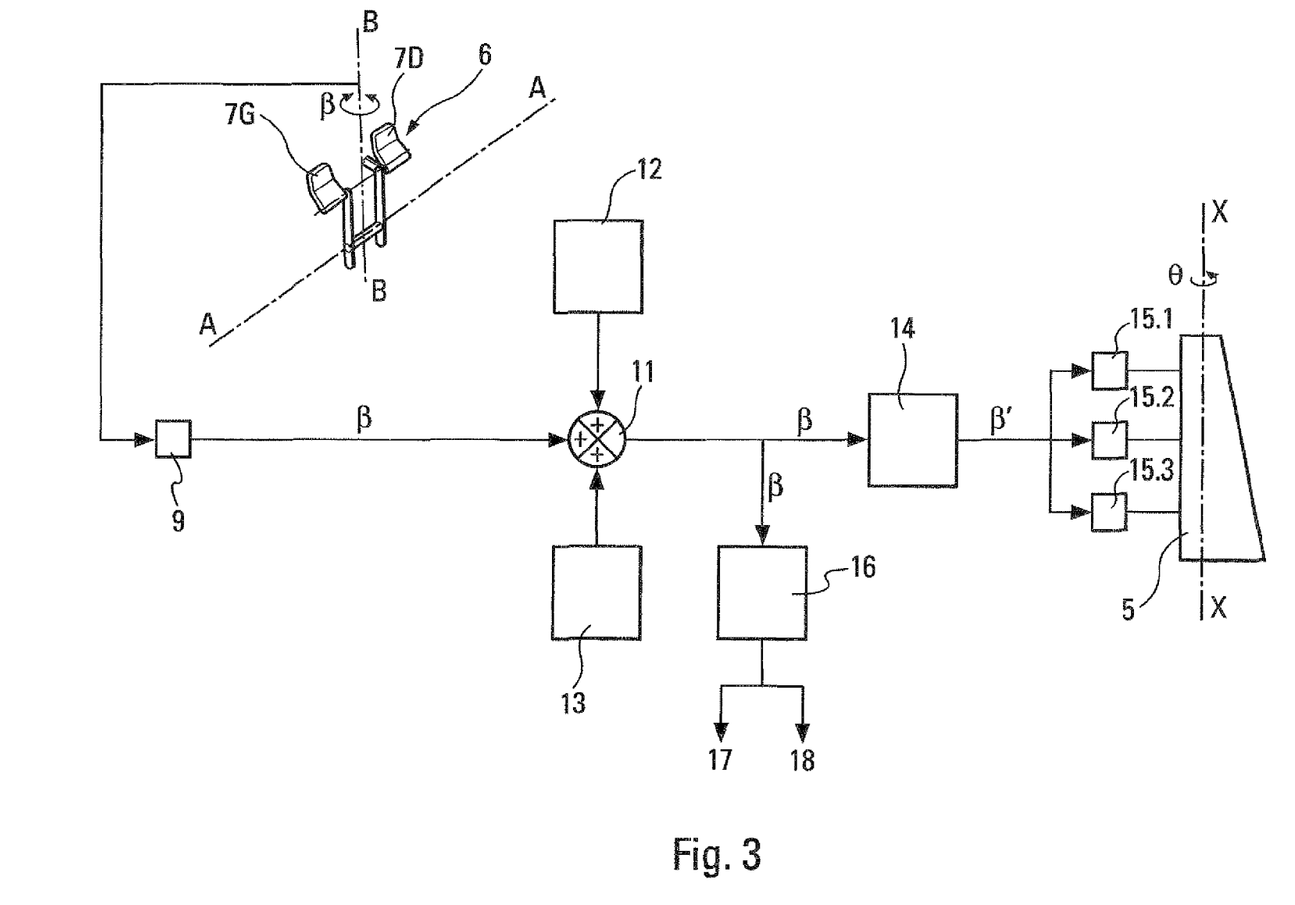
FIG. 3 is a block diagram of an embodiment of the yaw controlling device according to the present invention, with the purpose to command the rudder of the aircraft of FIGS. 1 and 2.

As shown on FIG. 3, the airplane 1 is provided with a mobile commanding system 6—or directional crossbar—available to the pilot of said airplane. As known, the commanding system 6 is intended, when the airplane 1 runs on the ground S or flies, for commanding the rotation of the rudder 5 of said airplane (see FIG. 4), around the axis X-X, in the two directions G and D.

To this end, the commanding system 6 is able to rotate around a vertical axis B-B (considered in a reference system (A-A, B-B, C-C) likely to be different from the reference system (X-X Y-Y, Z-Z) of the rudder 5), according to two opposite rotating directions being respectively associated with the two rotating directions G and D of the rudder 5. The commanding system 6 is, to this end, provided with two respectively left 7G and right 7D pedals, depressing the left pedal 7G being able to generate a rotation of the commanding system 6 in the rotating direction associated with the rotating direction to the left G of the rudder 5, whereas depressing the right pedal 7D being able to generate a rotation of said commanding system 6 in the rotating direction associated with the rotating direction to the right D of said rudder 5

The mobile commanding system 6 can therefore rotate (see FIG. 5) around the axis B-B, between an initial position (with a nil angle $\beta$) for which there is no command of rotation of the rudder 5 and a second position or breakpoint (with an angle $\beta$ equal to $\beta_{Gmax}$) for which the rotation of said system 6 is maximum. Between these two positions, the mobile commanding system 6 goes thru a first position (with an angle $\beta$ equal to $\beta_G(\theta_{Gmax})$) for which the maximum rotation breakpoint $\theta_{Gmax}$ to the left of the rudder 5 is reached.

Also, the mobile commanding system 6 can rotate (see FIG. 5) around the axis B-B, between the initial position (with a nil angle $\beta$) for which there is no command of rotation of the rudder 5 and a second position or breakpoint (with an angle $\beta$ equal to $\beta_{Dmax}$) for which the rotation of said system 6 is maximum. Between these two positions, the mobile commanding system 6 goes thru a first position (with an angle $\beta$ equal to $\beta_D(\theta_{Dmax})$) for which the maximum rotation breakpoint $\theta_{Dmax}$ to the right of the rudder 5 is reached.

Figure 5:
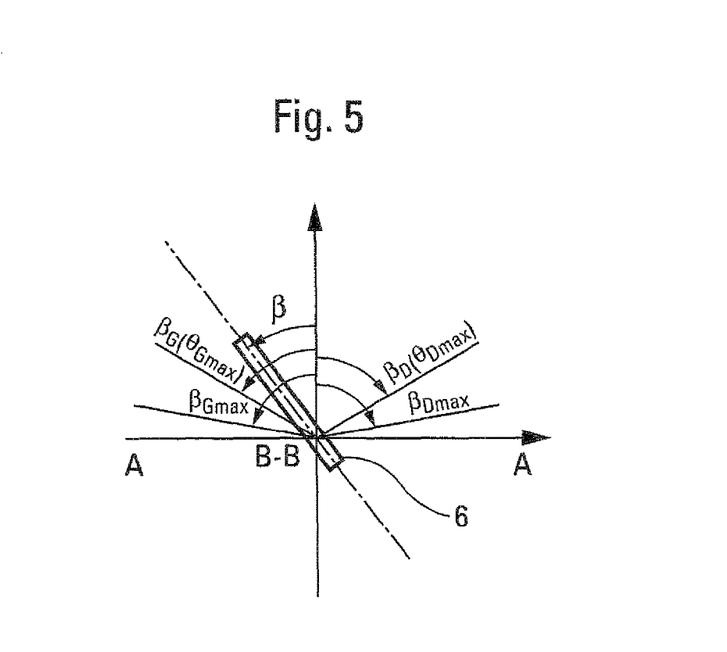
FIG. 5 is a top view of the mobile commanding system of the device of FIG. 3.

It should be noticed that, when the commanding system 6 is symmetrical, the values of $\beta_{Gmax}$ and $\beta_G(\theta_{Gmax})$ are respectively opposed to those of $\beta_{Dmax}$ and $\beta_D(\theta_{Dmax})$.

The yaw controlling device of the airplane 1, according to the present invention, is arranged between the mobile commanding system 6 and the rudder 5 so that the amplitude $\theta$ of the rotation of said rudder 5 depends on the amplitude $\beta$ of the movement of said mobile commanding system 6.

To this end, a transducer 9 is associated with the commanding system 6, so as to measure the amplitude $\beta$ of the rotating movement of said system. Thus, when the pilot, with his left (or right) foot, depresses the left 7G (or the right 7D) pedal, the movement in translation of said pedal is converted into a rotating movement of the mobile commanding system 6, the amplitude β of such movement being able to be measured by the transducer 9.

This command β is addressed to an adder 11, to which are also addressed orders issued from a yaw damper 12 and an automatic pilot 13. Thus, when the yaw damper 12 is activated, the command β addressed by the mobile commanding system 6 is taken into account when said damper 12 carries out a damping of the yaw maneuver of the airplane 1.

This command β is then addressed to a limiter 14, the function of which is limiting the rotating movement β addressed by the mobile commanding system 6 to values respectively $\beta_G(\theta_{Gmax})$ and $\beta_D(\theta_{Dmax})$ for which the maximum rotation breakpoints $\theta_{Gmax}$ and $\theta_{Dmax}$ of the rudder 5 are reached in the two rotating directions G and D, respectively, as a function of the speed V of the airplane 1, from a beforehand determined limitation speed threshold VminL (that could be for instance equal to 165 knots).

In this latter case, the movement of the commanding system 6 could overcome respectively the positions $\beta_G(\theta_{Gmax})$ and $\beta_D(\theta_{Dmax})$ of the latter corresponding respectively to the maximum rotation breakpoints $\theta_{Gmax}$ and $\theta_{Dmax}$ of the rudder 5.

More precisely, the limiter 14 is arranged so that, when the airplane 1 moves at a speed V lower than VminL, the limiter 14 does not apply any limit of movement $\beta_G(\theta_{Gmax})$ or $\beta_D(\theta_{Dmax})$. On the other hand, when the speed V of the airplane 1 is at least equal to VminL, new values are calculated of maximum rotation breakpoints $\theta_{Gmax}$ and $\theta_{Dmax}$ for the rudder, and then, there are applied at the level of the limiter 14, limits $\beta_G(\theta_{Gmax})$ and $\beta_D(\theta_{Dmax})$ so that:

if the command β is higher than the (positive) limit to the left $\beta_G(\theta_{Gmax})$ (the left pedal 7G being depressed for overcoming the position $\beta_G(\theta_{Gmax})$ of the latter corresponding to the maximum rotation breakpoint $\theta_{Gmax}$ to the left of the rudder 5), the resulting order of command β' is equal to $\beta_G(\theta_{Gmax})$;

if the command β is lower than the (negative) limit to the right $\beta_D(\theta_{Dmax})$ (the right pedal 7D being depressed for overcoming the position $\beta_D(\theta_{Dmax})$ of the latter corresponding to the maximum rotation breakpoint $\theta_{Dmax}$ to the right of the rudder 5), the resulting order of command β' is equal to $\beta_D(\theta_{Dmax})$;

otherwise, the resulting order of command β' is equal to the command β.

The resulting order of command β' is afterwards transmitted to a plurality of actuating devices 15.1, 15.2 and 15.3 of the rudder 5, so as to adjust the amplitude of rotation θ of said rudder, said amplitude of rotation θ being an increasing function of the resulting order of command β' and, consequently, of the command β.

Figure 6:
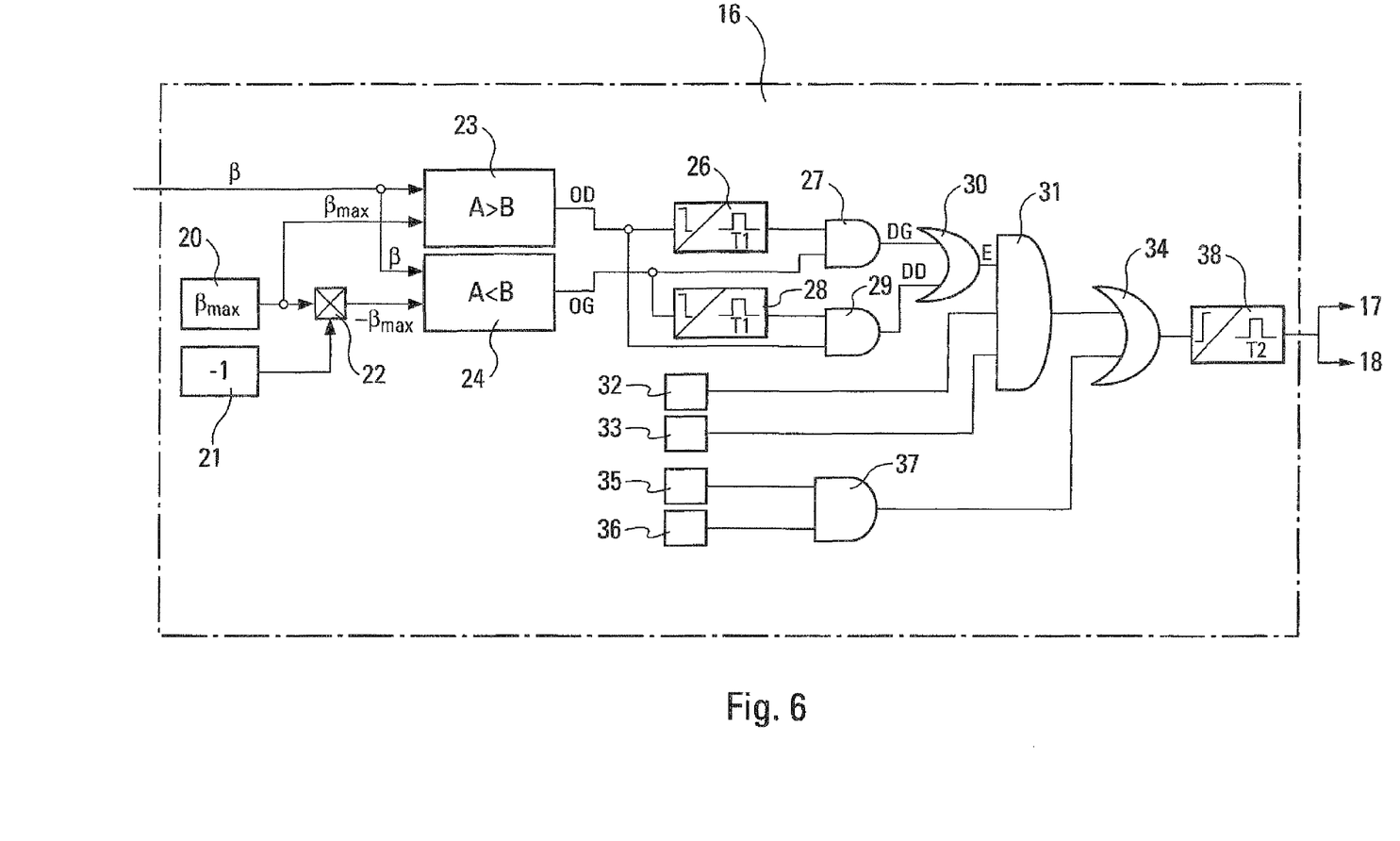
FIG. 6 is a block diagram of an example of an alert system according to the present invention, being integrated into the yaw controlling device of FIG. 3.

In addition to being addressed to the above described limiter 14 with reference to FIG. 3, the command β is also addressed to the alert system 16, shown in further details on FIG. 6.

This system first comprises, similarly to the limiter 14, a calculator 20 intended for calculating the new values of maximum rotation breakpoints $\theta_{Gmax}$ and $\theta_{Dmax}$ of the rudder 5, as a function of the speed V of the airplane 1 and of the beforehand determined limitation speed threshold VminL. The limits of movement $\beta_G(\theta_{Gmax})$ and $\beta_D(\theta_{Dmax})$ are then estimated from values $\theta_{Gmax}$ and $\theta_{Dmax}$ (via the increasing function linking the rotation amplitude θ of the rudder 5 to the command β). When the speed V of the airplane 1 is higher than the limitation speed threshold VminL, the limits of movement $\beta_G(\theta_{Gmax})$ and $\beta_D(\theta_{Dmax})$ are fractions respectively of the movements $\beta_{Gmax}$ and $\beta_{Dmax}$ of the mobile commanding system 6, respectively in the two rotating directions G and D, for which the latter are in breakpoints, and the pilot can therefore overcome said limits of movement $\beta_G(\theta_{Gmax})$ and $\beta_D(\theta_{Dmax})$.

The amplitudes respectively of the command β and of the limits of movement $\beta_G(\theta_{Gmax})$ and $\beta_D(\theta_{Dmax})$ are addressed to two binary comparators 23 and 24, respectively of the "A>B" and "A<B" types. In the example that follows, it will be assumed that $\beta_G(\theta_{Gmax})$ is equal to $\beta_D(\theta_{Dmax})$ and these two values will be referred to as $\beta_{max}$.

The first binary comparator 23 compares the values of β and $\beta_{max}$ and transmits in outlet a state OD, equal to '1' when β is at least equal to $\beta_{max}$ and to '0' otherwise. Before addressing the value of $\beta_{max}$ to the second binary comparator 24, the latter $\beta_{max}$ is transformed into $\beta_{max}$ by inversing multipliers 21, 22 adapted for multiplying $\beta_{max}$ by the value '−1'. The second binary comparator 24 compares the values of β and $\beta_{max}$ and transmits in outlet a state OG, equal to '1' when β is at least equal to $-\beta_{max}$ and to '0' otherwise. The states OG and OD therefore allow to determine whether the pilot has moved one of the commanding systems 6G or 6D so that the movement of the system 6G or 6D overcomes the position $\beta_G(\theta_{Gmax})$ ($\beta_{max}$ negative) or $\beta_D(\eta_{Dmax})$ ($\beta_{max}$ positive) of the latter corresponding to the maximum rotation breakpoint $\theta_{Gmax}$ or $\theta_{Dmax}$ in one of the rotating directions G or D of the rudder 5. Indeed, the couple {OG,OD} is equal to {0.1} when β is at least equal to $\beta_{max}$ (over-command of the left commanding system 6G), {1.0} when β is at most equal to $-\beta_{max}$ (over-command of the right commanding system 6D) and {0.0} otherwise.

These two states OG and OD are subsequently used for detecting a sudden possible inversion of over-command, that is switching of the value β from −βmax to +βmax (or inversely) in a first time interval of a predetermined duration T1.

To this end, a first "AND" gate 27 is provided, addressing a state DG, and to which there are addressed, on the one hand, the state OG without delay and, on the other hand, the state OD with a time delay equal to the above duration T1 (via a retarder 26).

Similarly, a second "AND" gate 29 is provided, addressing a state DD, and to which there are addressed, on the one hand, the state OG with a time delay equal to the above duration T1 (via a retarder 28) and, on the other hand, the state OD without delay.

As a result, at the level of these two "AND" gates 27 and 29:

if in the interval of duration T1, β has switched from −βmax to +βmax, OG without delay is equal to '1' and OD with delay is equal to '1', therefore DG is also equal to '1' (inversion of over-command left-right);

if in said interval of duration T1, β has switched from +βmax to −βmax, OG with delay is equal to '1' and OD without delay is equal to '1', therefore DD is also equal to '1' (inversion of over-command right-left);

otherwise, DG and DD are both equal to '0'.

The "OR" gate 30, to which the states DG and DD are addressed, then allows to address in outlet a state E being equal to '1' when an inversion of over-command has been detected in the time interval with a duration T1, and to '0' otherwise.

For the alert to be released, it is important that the state E is equal to '1' and, in addition, that at the level of the "AND" gate 31:

the speed V of the airplane 1 is at least equal to an alert speed threshold VminA, being higher than the limitation speed threshold VminL (and that could be for instance equal to 220 knots when VminL is equal to 165 knots);

this determination is carried out at the level of the comparator 32 comparing the speed V of the airplane 1 to said alert speed threshold VminA; and the alert system 16 is activated at the level of the switch 33.

If all these conditions are gathered (alert system 16 being activated, speed V at least equal to VminA, D in the state '1'), an alert is released during a time interval with a beforehand determined duration T2 (for instance of the order of 5 seconds), via a retarder 38.

The thus released alert could occur in the form of a visual signal, emitted by visual signaling devices 17 (such as a display, LEDs, etc.) receiving the release order for said alert; or a sound signal, emitted by sound emitting devices 18 receiving the releasing order for the alert; or still any other adequate type of signal.

The duration T1 is determined so that, on the one hand, the need to have available a high releasing speed of the alert is taken into account and, on the other hand, it could be determined, for sure, that an inversion of over-command has been initiated. To this end, a duration T1 at most equal to 3 seconds—or preferably ranging between 1 and 2 seconds—is found particularly adequate.

In a particular embodiment of the yaw controlling device according to this invention, it could also be provided, in the alert system device 16, for manually releasing the alert, for, for instance, performing operating tests without however requiring to effectively carry out an inversion of a yaw maneuver. To this end, a test button 35 could be made available to the pilot. Therefore, if simultaneously, at the level of the "AND" gate 37, the pilot depresses this test button 35 and the front wheel assembly 4 of the airplane 1 is compressed (this being determined by the module 36), the alert could be released similarly as described above with reference to the elements 38, 17 and 18.

Thus, in this case, via the "OR" gate 34, releasing the alert could occur either manually, or following the detection of an inversion of over-command.

The invention claimed is:

1. A method for yaw controlling of an aircraft, wherein the aircraft includes a jointed rudder that is rotatable in two opposite rotating directions between an aerodynamically neutral position and a maximum rotation breakpoint; and a commanding system located proximate to a pilot of the aircraft and operative to control rotation of the rudder, the commanding system being movable by rotation in two opposite directions corresponding respectively to the two opposite rotating directions of the jointed rudder, wherein a rotation amplitude of the rudder is controlled by actuating devices so as to depend on an amplitude of the rotation of the commanding system, and the commanding system being rotatable in each of the two opposite directions to first positions corresponding to movement of the rudder to the respective maximum rotation breakpoints and then further to at least one second position overshooting the amplitude of rotation of the commanding system at the first positions, the method comprising:

monitoring the amplitude of rotation of the commanding system with a transducer operatively connected to each of the commanding system, the actuating devices for the rudder, and an alert system;

detecting with the transducer that the pilot commanding system in one of the two opposite directions beyond the first position to the at least one second position to cause rotation of the rudder to the maximum rotation breakpoint in one of the rotating directions of the rudder;

detecting with the transducer that the pilot has rotated the commanding system in the other of the two opposite directions beyond the first position to the at least one second position to cause rotation of the rudder to the maximum rotation breakpoint in the other of the rotating directions of the rudder;

determining with the alert system if a rudder inversion condition has been invoked by detected rotations of the commanding system by the pilot between (i) the at least one second position in one of the two opposite directions to (ii) the at least one second position in the other of the two opposite directions within a first time interval of a predetermined duration; and emitting an alert with the alert system when the rudder inversion condition has been invoked by the pilot to notify the pilot of the potentially unsafe rudder inversion condition.

2. The method according to claim 1, wherein the determining step further comprises:

determining with the alert system if a rudder inversion condition has been invoked by detected rotations of the commanding system by the pilot between (i) the at least one second position in one of the two opposite directions to (ii) the at least one second position in the other of the two opposite directions within the first time interval, which is less than or equal to 3 seconds.

3. The method according to claim 2, wherein the determining step further comprises:

determining with the alert system if a rudder inversion condition has been invoked by detected rotations of the commanding system by the pilot between (i) the at least one second position in one of the two opposite directions to (ii) the at least one second position in the other of the two opposite directions within the first time interval, which ranges between 1 and 2 seconds.

4. The method according to claim 1, wherein the rotation of the commanding system can reach the at least one second position overshooting the amplitude of rotation of the commanding system at the first positions only when a speed of the aircraft is at least equal to a limitation speed threshold, and emitting the alert further comprises:

emitting an alert with the alert system when the rudder inversion condition has been invoked by the pilot and only when the speed of the aircraft is at least equal to an alert speed threshold that is higher than the limitation speed threshold.

5. The method according to claim 1, further comprising:

maintaining the alert during a second time interval of a duration greater than or equal to 5 seconds.

6. The method according to claim 1, wherein the commanding system includes a pair of pedals used by the pilot to control rotation of the commanding system, and emitting the alert further comprises:

generating a visual signal to the attention of the pilot using a visual signaling device.

7. The method according to claim 1, wherein the commanding system includes a pair of pedals used by the pilot to control rotation of the commanding system, and emitting the alert further comprises:

generating a sound signal to the attention of the pilot using a sound emitting device.

8. The method according to claim 1, wherein the alert system of the aircraft further includes processing elements including a maximum calculator, binary comparators, and at least one retarder for delaying a control signal by a predetermined time shift, and the determining step further comprises:

receiving a first control signal indicating the amplitude of the rotation of the commanding system;

generating a second control signal with the maximum calculator based on a current speed of the aircraft, the second control signal indicating the first positions corresponding to movement of the rudder to the respective maximum rotation breakpoints at the current speed;

comparing the first and second control signals with the binary comparators to generate a first overshoot control signal if the pilot has rotated the commanding system in one of the two opposite directions beyond the corresponding first position and to generate a second overshoot control signal if the pilot has rotated the commanding system in the other of the two opposite directions beyond the corresponding first position;

delaying at least one of the first and second overshoot control signals with the at least one retarder so as to compare time shifted first and second overshoot control signals to thereby determine whether the rudder inversion condition has been invoked within the first time interval; and generating an alert actuating signal when the compared time shifted first and second overshoot control signals indicate a rudder inversion condition has been invoked.

9. The method according to claim 8, wherein the alert system of the aircraft further includes an inversing multiplier, and comparing the first and second control signals with the binary comparators further comprises:

sending the first control signal and the second control signal to a first of the binary comparators so that it can be determined whether the first control signal defines a value greater than the second control signal, thereby prompting the generation of the first overshoot control signal; and sending the first control signal and an inverted second control signal, which is formed by applying the inversing multiplier to the second control signal, to a second of the binary comparators so that is can be determined whether the first control signal defines a value less than the inverted second control signal, thereby prompting the generation of the second overshoot control signal.

10. A device for yaw controlling of an aircraft, wherein the aircraft includes a jointed rudder that is rotatable in two opposite rotating directions between an aerodynamically neutral position and a maximum rotation breakpoint; and a commanding system located proximate to a pilot of the aircraft and operative to control rotation of the rudder, the commanding system being movable by rotation in two opposite directions corresponding respectively to the two opposite rotating directions of the jointed rudder, wherein a rotation amplitude of the rudder is controlled by actuating devices so as to depend on an amplitude of the rotation of the commanding system, and the commanding system being rotatable in each of the two opposite directions to first positions corresponding to movement of the rudder to the respective maximum rotation breakpoints and then further to at least one second position overshooting the amplitude of rotation of the commanding system at the first positions, wherein the device comprises:

a transducer that measures the amplitude of the rotation of the commanding system, thereby to detect when (i) the pilot rotates the commanding system to the at least one second position in one of the two opposite directions and when (ii) the pilot rotates the commanding system to the at least one second position in the other of the two opposite directions;

an alert system that determines if a rudder inversion condition has been invoked by detected rotations of the commanding system by the pilot between (i) the at least one second position in one of the two opposite directions to (ii) the at least one second position in the other of the two opposite directions within a first time interval of a predetermined duration, and then emits an alert when the rudder inversion condition has been invoked by the pilot to notify the pilot of the potentially unsafe rudder inversion condition;

at least one actuating device that rotates the rudder based on a control signal received from the transducer based on the amplitude of rotation of the commanding system; and a limiter operatively connected to the transducer and the at least one actuating device, the limiter modifying the control signal from the transducer to prevent rotation of the rudder with the at least one actuating device beyond the maximum rotation breakpoints in the two opposite rotating directions.

11. The device according to claim 10, further comprising:
a visual signaling device that generates a visual signal to the attention of the pilot when the alert is to be emitted by the alert system.

12. The device according to claim 11, wherein the visual signaling device comprises one of a visual display screen and light emitting diodes proximate to the pilot.

13. The device according to claim 10, further comprising:
a sound emitting device that generates a sound signal to the attention of the pilot when the alert is to be emitted by the alert system.

14. The device according to claim 10, further comprising:
an adder communicating with the transducer and the limiter, the adder combining the control signal received from the transducer with additional control commands from a yaw damper and an autopilot system on the aircraft, thereby generating a combined control signal to send to the limiter.

15. The device according to claim 10, wherein the limiter varies the maximum rotation breakpoints of the rotation of the rudder based on a speed of the aircraft.

16. A device for yaw controlling of an aircraft, wherein the aircraft includes a jointed rudder that is rotatable in two opposite rotating directions between an aerodynamically neutral position and a maximum rotation breakpoint; and a commanding system located proximate to a pilot of the aircraft and operative to control rotation of the rudder, the commanding system being movable by rotation in two opposite directions corresponding respectively to the two opposite rotating directions of the jointed rudder, wherein a rotation amplitude of the rudder is controlled by actuating devices so as to depend on an amplitude of the rotation of the commanding system, and the commanding system being rotatable in each of the two opposite directions to first positions corresponding to movement of the rudder to the respective maximum rotation breakpoints and then further to at least one second position overshooting the amplitude of rotation of the commanding system at the first positions, wherein the device comprises:

a transducer that measures the amplitude of the rotation of the commanding system, thereby to detect when (i) the pilot rotates the commanding system to the at least one second position in one of the two opposite directions and when (ii) the pilot rotates the commanding system to the at least one second position in the other of the two opposite directions; and an alert system that determines if a rudder inversion condition has been invoked by detected rotations of the commanding system by the pilot between (i) the at least one second position in one of the two opposite directions to (ii) the at least one second position in the other of the two opposite directions within a first time interval of a predetermined duration, and then emits an alert when the rudder inversion condition has been invoked by the pilot to notify the pilot of the potentially unsafe rudder inversion condition; wherein the alert system receives a first control signal from the transducer indicating an amplitude of the rotation of the commanding system, and the alert system further comprises:

a maximum calculator that generates a second control signal based on a current speed of the aircraft, the second control signal indicating the first positions corresponding to movement of the rudder to the respective maximum rotation breakpoints at the current speed;

binary comparators that compare the first and second control signals to generate a first overshoot control signal if the pilot has rotated the commanding system in one of the two opposite directions beyond the corresponding first position and to generate a second overshoot control signal if the pilot has rotated the commanding system in the other of the two opposite directions beyond the corresponding first position; and at least one retarder that delays at least one of the first and second overshoot control signals so as to compare time shifted first and second overshoot control signals to thereby determine whether the rudder inversion condition has been invoked within the first time interval.

* * * * *